(12) United States Patent
Ozeki

(10) Patent No.: US 8,640,354 B2
(45) Date of Patent: *Feb. 4, 2014

(54) METHOD FOR MEASURING DEVIATION OF JOINT POSITION OF MEMBER AND METHOD FOR PRODUCING SPARK PLUG

(75) Inventor: Atsushi Ozeki, Seto (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 214 days.

This patent is subject to a terminal disclaimer.

(21) Appl. No.: 13/202,346

(22) PCT Filed: Mar. 15, 2010

(86) PCT No.: PCT/JP2010/001816
§ 371 (c)(1),
(2), (4) Date: Aug. 19, 2011

(87) PCT Pub. No.: WO2010/106774
PCT Pub. Date: Sep. 23, 2010

(65) Prior Publication Data
US 2011/0314687 A1 Dec. 29, 2011

(30) Foreign Application Priority Data
Mar. 16, 2009 (JP) .................. 2009-063113

(51) Int. Cl.
*H01T 13/58* (2011.01)
*H01T 21/00* (2006.01)

(52) U.S. Cl.
USPC .................. 33/613; 33/600; 445/7

(58) Field of Classification Search
USPC .......... 33/613, 1 N, 712, 600; 445/7
See application file for complete search history.

(56) References Cited

U.S. PATENT DOCUMENTS

| 4,060,900 | A | * | 12/1977 | Greenwood | 33/471 |
| 4,150,490 | A | * | 4/1979 | Sluka | 33/613 |
| 5,134,783 | A | * | 8/1992 | Perry | 33/645 |
| 5,365,672 | A | * | 11/1994 | Kato | 33/520 |

(Continued)

FOREIGN PATENT DOCUMENTS

| JP | 08-181493 | | 7/1996 |
| JP | 2002-141156 | | 5/2002 |
| JP | 2002-143969 | | 5/2002 |
| JP | 2007080638 A | * | 3/2007 |

OTHER PUBLICATIONS

International Search Report mailed Jun. 1, 2010 for the corresponding PCT application No. PCT/JP2010/001816.

*Primary Examiner* — Christopher Fulton
(74) *Attorney, Agent, or Firm* — Leason Ellis LLP

(57) ABSTRACT

A method for measuring a deviation from a joint target position of a member to which a measuring object is joined, in particular, measuring the deviation of an electrode position of a spark plug. The deviation of a ground electrode from an optimal igniting position O1 is measured while a metallic shell is engaged with a female thread jig. A distance "ε" between an axis A of the ground electrode and a reference straight line LS is calculated. The distance "ε" is a vertical length from the axis A to the reference straight line LS. An angle "α" between a first straight line L1 and the reference straight line LS is calculated using the distance "ε" and a predetermined distance "β" between the axis A of the ground electrode and an axis O of the metallic shell.

16 Claims, 13 Drawing Sheets

(56) References Cited

U.S. PATENT DOCUMENTS 6,293,029 B1 * 9/2001 Fahley ............................ 33/645
8,052,495 B2 * 11/2011 Kato et al. ........................ 445/7
2011/0287683 A1 * 11/2011 Ozeki ............................... 445/7

* cited by examiner (a)

(b)

(a)

(b)

METHOD FOR MEASURING DEVIATION OF JOINT POSITION OF MEMBER AND METHOD FOR PRODUCING SPARK PLUG

CROSS-REFERENCE TO RELATED APPLICATIONS

This application is a U.S. National Phase Application under 35 U.S.C. §371 of International Patent Application No. PCT/JP2010/001816, filed Mar. 15, 2010, and claims the benefit of Japanese Patent Application No. 2009-063113, filed Mar. 16, 2009, all of which are incorporated by reference herein. The International Application was published in Japanese on Sep. 23, 2010 as International Publication No. WO/2010/106774 under PCT Article 21(2).

FIELD OF THE INVENTION

The present invention relates to a method for measuring a deviation of a member joined to a measuring object from a joint target position using a female thread jig, particularly the deviation of an electrode position of a spark plug, and further relates to a method for manufacturing a spark plug which adapts said measuring method.

BACKGROUND OF THE INVENTION

A metallic shell of a spark plug is provided with a center electrode and a ground electrode which are positioned so as to face each other having a space, what is called a spark gap, therebetween. Recently, in order to further improve fuel consumption, the ground electrode is joined to the metallic shell in an optimal igniting position when the spark plug is mounted on an internal combustion engine with a specified torque. Notably, the "optimal igniting position" means a location where a growth of flame kernel generated by spark discharge in the spark gap is not interfered by airflow of an air-fuel mixture in a combustion chamber. Henceforth, it is called the optimal igniting position in this specification.

Generally, in order to check a joint position of a ground electrode, a female thread jig is employed. The female thread jig assumes the same shape as a female thread of a cylinder head of an internal combustion engine for mounting a spark plug. In such a female thread jig, an allowable angle range of the ground electrode when the metallic shell is engaged with a female thread is indicated. The allowable angle range means an allowable deviation (angle) range of the ground electrode whose position deviates from the optimal igniting position. A person who checks the deviation of the ground electrode engages the metallic shell with the female thread jig with the same torque as that used at the time of mounting a spark plug on a cylinder head. Then, the person conducts a visual inspection to check whether or not the location of the ground electrode is in the allowable angle range and then judges the quality of a product (metallic shell).

PRIOR ART DOCUMENT

Patent Document

Japanese Patent Application Laid-Open (kokai) No. 2002-141156

SUMMARY OF THE INVENTION

Problems to be Solved by the Invention

However, when an inspector visually checks the deviation, the judgment varies according to the inspector's subjective view. As a result, variations in the quality tend to arise.

The above-mentioned problems are common not only for a metallic shell of spark plugs but also for various products having a member joined to a predetermined location.

This invention has been achieved in view of the above problems, and an object of the invention is to improve a measurement accuracy of a deviation of the member, which is joined to the measuring object, from the joint target position.

Means for Solving the Problems

The present invention has been achieved in order to solve at least a part of the above problems, and the present invention can be realized in the following mode or aspect.
[Aspect 1]
A method for measuring a deviation of a member from a joint target position comprising: joining a member to a measuring object having an end face at a position other than an axis of the measuring object on the end face; engaging the measuring object with a female thread jig having a reference portion that serves as a reference for the joint target position of the member in the measuring object; measuring a shortest distance between an axis of the member and a reference straight line which connects the axis of the measuring object to the reference portion on a planar measuring face that is perpendicular to the axis of the measuring object, while the measuring object is engaged with the female thread jig; and measuring a deviation of the member from the joint target position based on the thus-measured shortest distance.
[Aspect 2]
In the measuring method according to Aspect 1, wherein the measuring object is a metallic shell for spark plugs, and the member is a ground electrode joined to the metallic shell.
[Aspect 3]
In the measuring method according to Aspect 1 or 2, wherein the deviation is represented by an angle between the reference straight line and a first straight line that passes through the axis of the measuring object and the axis of the member, and wherein, in the measurement of the deviation, the angle is calculated based on the shortest distance and a length between the axis of the member and the axis of the measuring object.
[Aspect 4]
In the measuring method according to any one of Aspects 1 to 3, wherein the measuring face is a face near a joint portion of the member and the measuring object.
[Aspect 5]
In the measuring method according to any one of Aspects 1 to 4, wherein, in the measurement of the deviation, the shortest distance between the axis of the member and the reference straight line is measured by a non-contact-type translucent displacement sensor.
[Aspect 6]
In the measuring method according to any one of Aspects 1 to 4, wherein, in the measurement of the deviation, the shortest distance between the axis of the member and the reference straight line is measured by a contact-type displacement sensor.
[Aspect 7]
A method for manufacturing a spark plug comprising: joining a ground electrode to an end face of a cylindrical metallic shell; engaging the metallic shell joined to the ground electrode with a female thread jig having a reference portion that serves as a reference of a joint target position of the ground electrode in the metallic shell; measuring a shortest distance between an axis of the ground electrode that is joined to the metallic shell and a reference straight line which connects the axis of the metallic shell to the reference portion on a planar measuring face that is perpendicular to the axis of the metallic shell, while the metallic shell is engaged with the female thread jig; measuring a deviation of the ground electrode from the joint target position based on the thus-measured shortest distance; judging whether or not the measured deviation is within a predetermined allowable range; fitting an insulator where a center electrode and a terminal fitting are assembled to the metallic shell in which the deviation is judged to be within the allowable range; and forming a front end of the ground electrode so as to face the center electrode.

In the present invention, various modes mentioned above can be suitably combined, or a part thereof can be omitted.

According to the measuring method of Aspect 1, the deviation of the member from the joint target position is measured based on the shortest distance between the axis of the member and the reference straight line which connects the axis of the measuring object to the reference portion, while the measuring object is engaged with the female thread jig. Thus, the deviation of the member from the joint target position can be represented in numerical terms. Also, an accurate evaluation of the deviation of the joint target position of the member is achievable. As a result, variations in the quality of the measuring object can be prevented.

According to the measuring method of Aspect 2, the deviation of the ground electrode, which is joined to the metallic shell for a spark plug, from the joint target position can be accurately measured. Thus, variations in the quality of the metallic shell can be prevented.

According to the measuring method of Aspect 3, the angle between the reference straight line and the first straight line that passes through the axis of the measuring object and the axis of the member is calculated as the deviation. Thus, since the deviation of the member is calculated as a circumferential angle centering on the axis of the measuring object, improvement in measurement accuracy of the deviation is achievable. As a result, variations in the quality of the measuring object can be prevented.

According to the measuring method of Aspect 4, the deviation is measured near the joint portion of the member and the measuring object. Thus, any incorrect-measurement of the shortest distance between the axis of the member and the reference straight line due to the inclined member is prevented. As a result, improvement in measurement accuracy of the shortest distance between the axis of the member and the reference straight line is achievable.

According to the measuring method of Aspect 5, the distance between the axis of the member and the reference straight line is measured by the non-contact-type translucent displacement sensor. Thus, the shortest distance between the axis of the member and the reference straight line can be measured with a simple configuration. Moreover, since the measurement by a sensor generally requires only a short period of time, it is possible to reduce the measurement time of the deviation. Further, since the measuring method of Aspect 5 uses the non-contact-type displacement sensor, it is also advantageous for avoiding any damage to the member at the time of the measurement.

According to the measuring method of Aspect 6, the shortest distance between the axis of the member and the reference straight line is measured by the contact-type displacement sensor. Thus, the accurate measurement of the distance is achievable.

According to the manufacturing method of Aspect 7, the spark plug is manufactured in such a manner that the deviation of the electrode from the joint target position is measured based on the shortest distance between the axis of the ground electrode and the reference straight line which connects the axis of the metallic shell to the reference portion, while the metallic shell is engaged with the female thread jig. Further, the insulator is joined to the metallic shell in which the deviation is judged to be within the allowable range. Thus, variations in the quality of the spark plug can be prevented.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Best Mode for Carrying Out the Invention

A. First Embodiment

A1. Composition of Spark Plug

Figure 1:
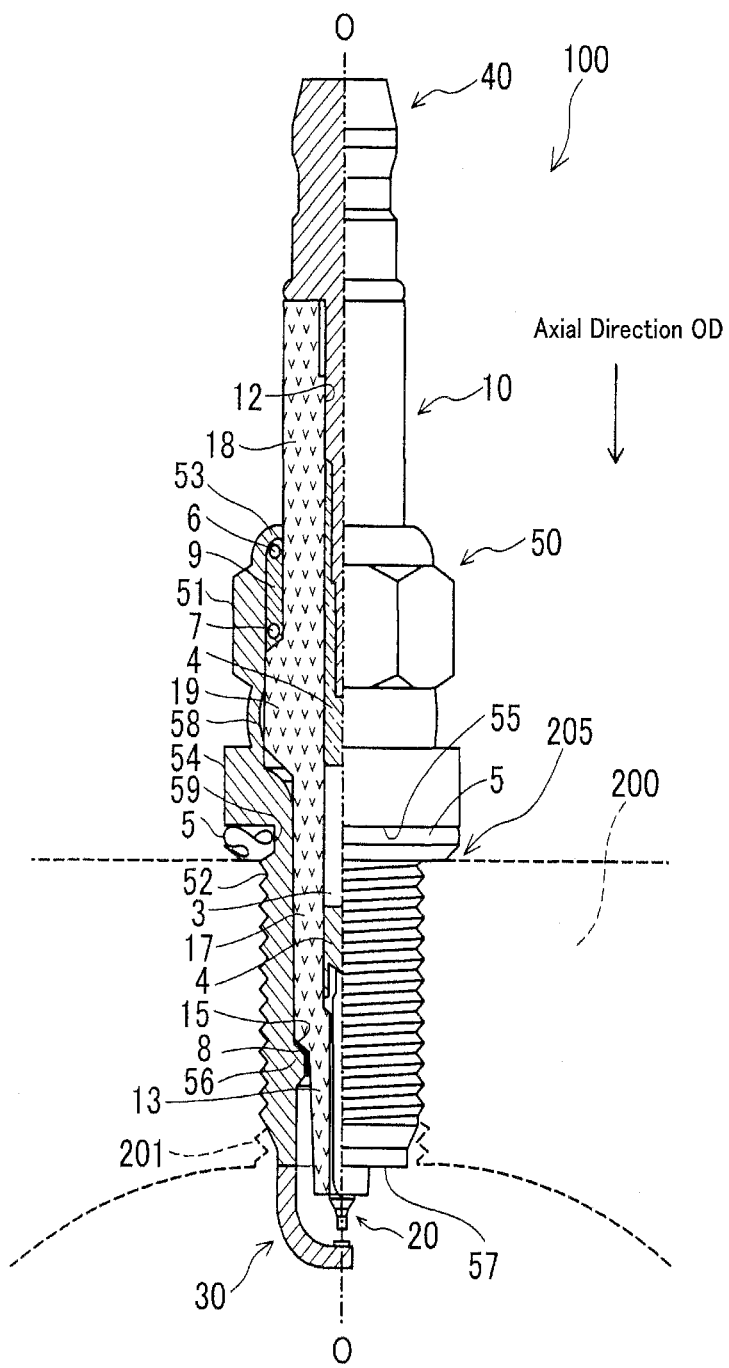
FIG. 1 is a partially sectioned view of a spark plug 100 according to a first embodiment.

Hereafter, an embodiment of the present invention will be described. FIG. 1 is a partially sectioned view of a spark plug 100 according to a first embodiment. Notably, in FIG. 1, the spark plug 100 is depicted in such a manner that an axial direction OD of the spark plug 100 coincide with the vertical direction in FIG. 1. Further, in the following description, the lower side of FIG. 1 will be referred to as a front end side of the spark plug 100, and the upper side of FIG. 1 will be referred to as a rear end side of the spark plug 100.

As shown in FIG. 1, the spark plug 100 is comprised of a ceramic insulator 10 serving as an insulator, a metallic shell 50 holding therein the ceramic insulator 10, a center electrode 20 held in the ceramic insulator 10 in the axial direction OD, a ground electrode 30, and a terminal fitting 40 formed in the rear end portion of the ceramic insulator 10.

As is well known, the ceramic insulator 10 is made of alumina or the like through firing and has a tubular shape such that an axial hole 12 extends therethrough coaxially along the axial direction OD. The ceramic insulator 10 has a flange portion 19 having the largest outside diameter and located substantially at the center with respect to the axial direction OD and a rear trunk portion 18 located rearward (upward in FIG. 1) of the flange portion 19. The ceramic insulator 10 also has a front trunk portion 17 smaller in outside diameter than that of the rear trunk portion 18 and located frontward (downward in FIG. 1) of the flange portion 19, and a leg portion 13 smaller in outside diameter than that of the front trunk portion 17 and located frontward of the front trunk portion 17. The leg portion 13 is reduced in diameter in the frontward direction and is exposed to a combustion chamber of an internal combustion engine when the spark plug 100 is mounted to an engine head 200 of the engine. A step portion 15 is formed between the leg portion 13 and the front trunk portion 17.

The metallic shell 50 of the spark plug 100 is a cylindrical tubular metallic member which surrounds and holds a portion of the insulator 10 extending from the rear trunk portion 18 to the leg portion 13, and, in the present embodiment, is formed of low carbon steel. The metallic shell 50 includes a tool engagement portion 51 for fitting to a spark plug wrench (not illustrated) and a mount screw portion 52 where screw threads are formed thereon for engaging the spark plug 100 with a threaded mounting hole 201 of the engine head 200 located in an upper portion of a combustion chamber.

The metallic shell 50 has a flange-like seal portion 54 formed between the tool engagement portion 51 and the mount screw portion 52. An annular gasket 5 formed by folding a sheet is fitted to a screw neck 59 between the mount screw portion 52 and the seal portion 54. When the spark plug 100 is mounted to the engine head 200, the gasket 5 is crushed and deformed between a seat surface 55 of the seal portion 54 and a peripheral surface 205 around the opening of the thread mounting hole 201. The deformation of the gasket 5 provides a seal between the spark plug 100 and the engine head 200, thereby ensuring gastightness within an engine via the thread mounting hole 201.

The metallic shell 50 has a thin-walled crimp portion 53 located rearward of the tool engagement portion 51. The metallic shell 50 also has a buckle portion 58, which is thin-walled similar to the crimp portion 53, between the seal portion 54 and the tool engagement portion 51. Annular ring members 6, 7 intervene between an outer circumferential surface of the rear trunk portion 18 of the ceramic insulator 10 and an inner circumferential surface of the metallic shell 50 extending from the tool engagement portion 51 to the crimp portion 53. Further, a space between the two ring members 6, 7 is filled with powder of talc 9. When the crimp portion 53 is crimped inward, the ceramic insulator 10 is pressed frontward within the metallic shell 50 via the ring members 6, 7 and the talc 9. Accordingly, the stepped portion 15 of the ceramic insulator 10 is supported by a stepped portion 56 formed on the inner circumference of the metallic shell 50, whereby the metallic shell 50 and the ceramic insulator 10 are united together. At this time, gas tightness between the metallic shell 50 and the ceramic insulator 10 is maintained by means of an annular sheet packing 8 which intervenes between the stepped portion 15 of the ceramic insulator 10 and the stepped portion 56 of the metallic shell 50, thereby preventing outflow of combustion gas. The buckle portion 58 is designed to be deformed outwardly in association with application of compressive force in a crimping process, thereby contributing toward increasing the stroke of compression of the talc 9 and thus enhancing gastightness within the metallic shell 50. A clearance having a predetermined dimension is provided between the ceramic insulator 10 and a portion of the metallic shell 50 located frontward of the step portion 56.

In the circumferential direction centering on the axis direction OD of the spark plug 100, it is preferable that the ground electrode 30 be joined to a position which contributes to the maximum engine performance in a front end face 57 of the metallic shell 50 (hereinafter referred to as an optimal igniting position). However, the ground electrode 30 does not necessarily match with the optimal igniting position. As long as the ground electrode 30 is within a predetermined allowable angle range, it is generally accepted as a good quality. Below, the method for manufacturing the spark plug 100 will be described. The optimal igniting position means a position where a growth of a flame kernel generated by spark discharge in the spark gap is not interfered by an air current of the air-fuel mixture in a combustion chamber, i.e., a position where the flame is grown most effectively. In addition, the metallic shell 50 corresponds to a "measuring object" in the claims, the ground electrode 30 corresponds to a "member" in the claims, and the optimal igniting position corresponds to a "joint target position" in the claims.

A2. Method for Manufacturing Spark Plug

Figure 2:
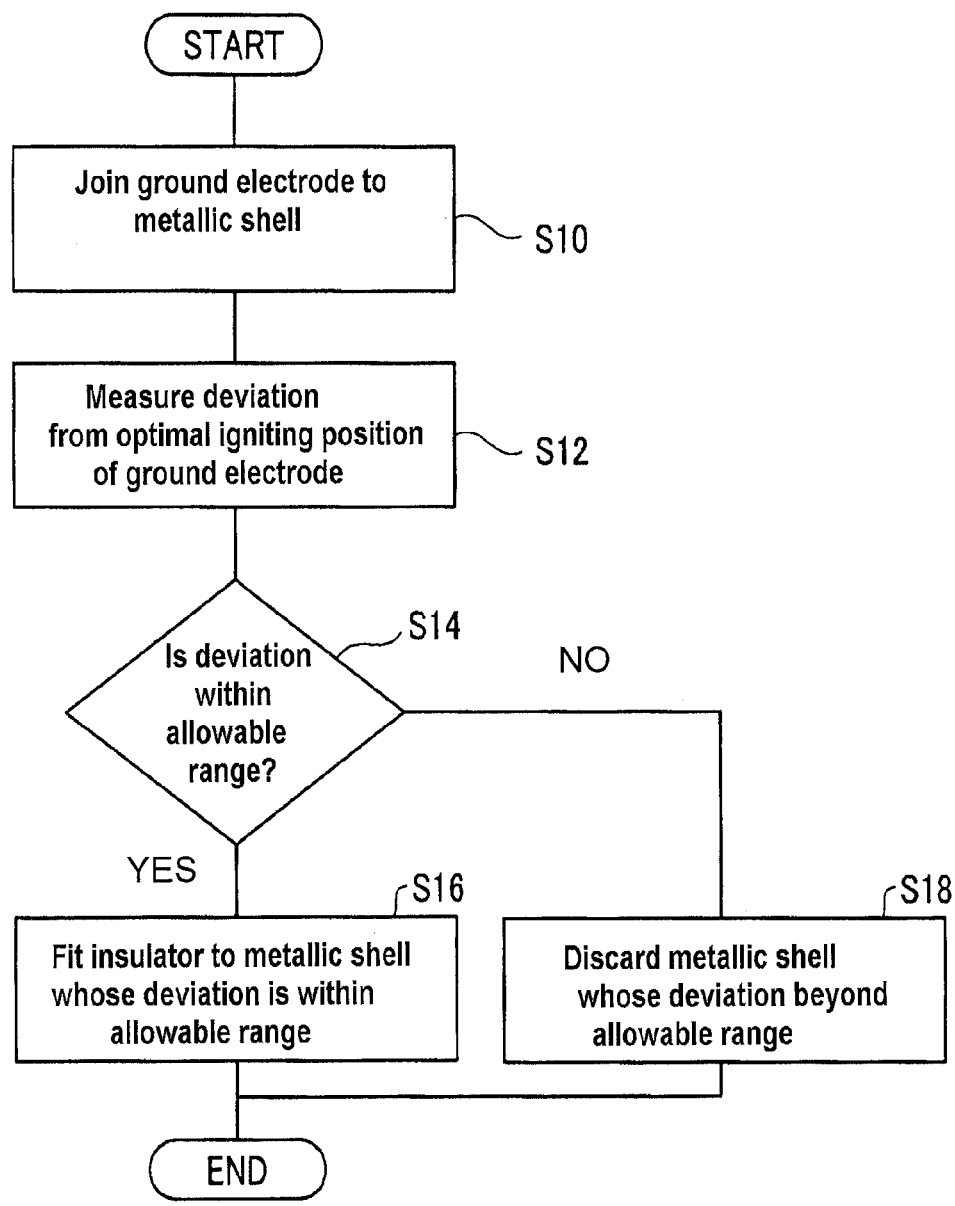
FIG. 2 is a flow chart explaining a method for manufacturing the spark plug 100 according to the first embodiment.

FIG. 2 is a flow chart explaining a method for manufacturing the spark plug 100 according to the first embodiment. The ground electrode 30 is joined to the metallic shell 50 (Step S10), and a deviation of the ground electrode 30, which is joined to the metallic shell 50, from the optimal igniting position is measured using a female thread jig (Step S12). A method for measuring the deviation will be later described in detail.

After judging whether or not the measured deviation is within a predetermined allowable range (Step S14), the insulator equipped with the center electrode 20 is assembled with the metallic shell 50. Thereafter, the ground electrode 30 is bent so as to face the center electrode 20 (Step S16). In this way, the spark plug 100 is manufactured. Any metallic shell 50 having the deviation beyond the allowable range is discarded (Step S18).

Figure 3:
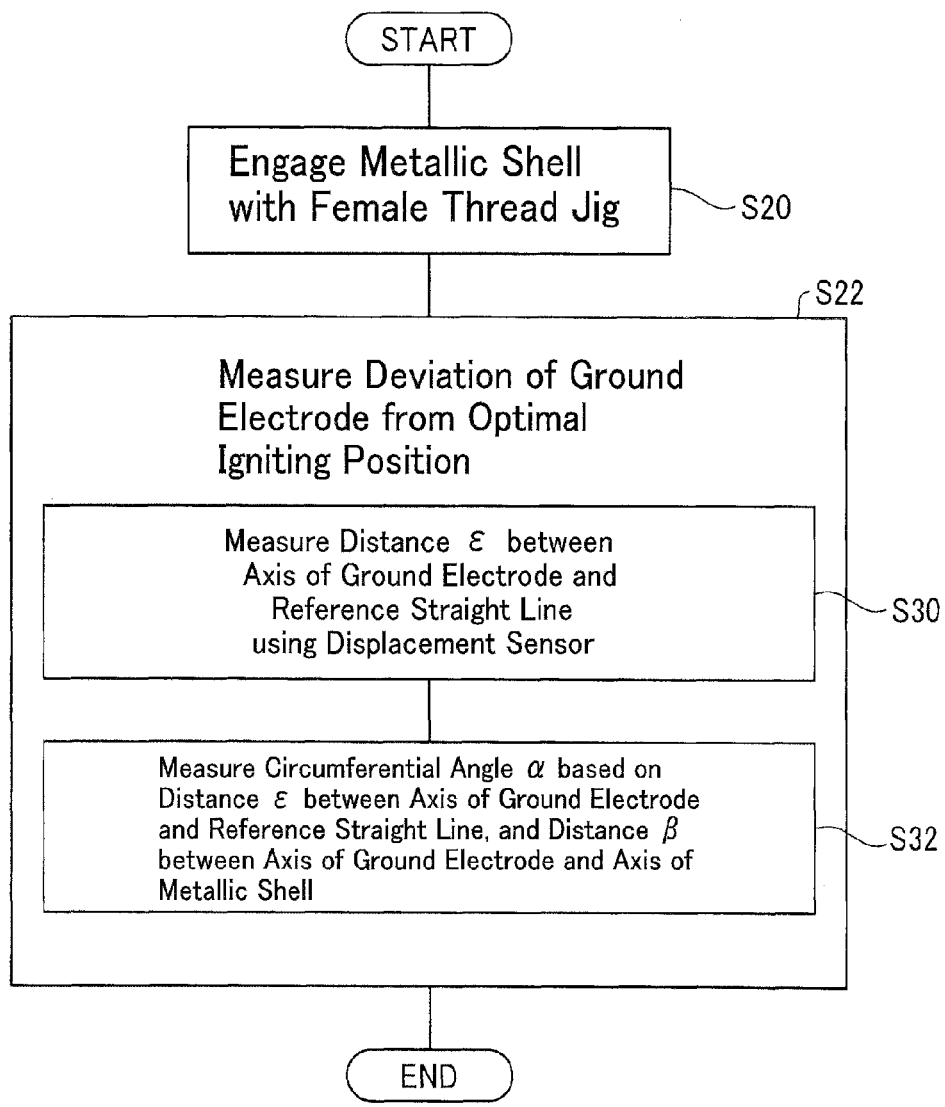
FIG. 3 is a flow chart explaining a measuring method of a deviation according to the first embodiment.

A3. Method for measuring Deviation of Ground Electrode from Joint Target Position A method for measuring the deviation of the ground electrode 30 that is joined to the metallic shell 50 from the optimal igniting position will be described. In the first embodiment, the deviation of the ground electrode 30 joined to the metallic shell 50 is measured using the female thread jig. FIG. 3 is a flow chart explaining the measuring method of the deviation of the ground electrode 30 from the optimal igniting position according to the first embodiment. This measuring method corresponds to S12 in FIG. 2.

The metallic shell 50 is engaged with the female thread jig 300 with the generally same torque as is used when the metallic shell 50 is mounted on an internal combustion engine (Step S20). The engagement of the metallic shell 50 with the female thread jig 300 will be described with reference to FIGS. 4 to 6.

Figure 4:
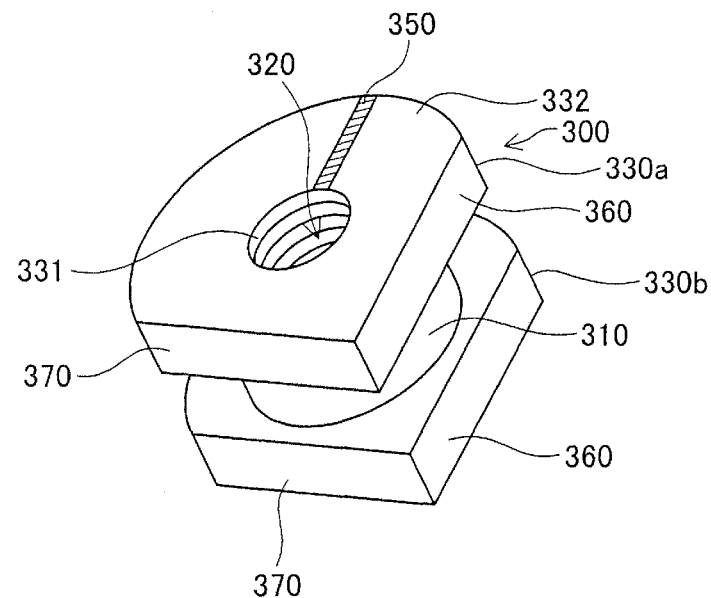
FIGS. 4a and 4b are explanatory views showing a female thread jig 300 according to the first embodiment.
Figure 4:
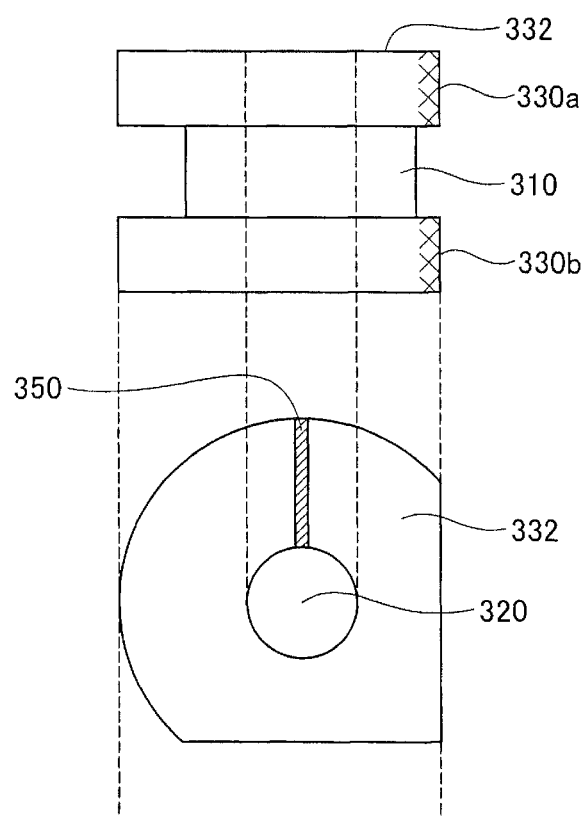

FIG. 4 is an explanatory view showing a female thread jig 300 according to the first embodiment. FIG. 4 (*a*) is a perspective view of the female thread jig 300, and FIG. 4 (*b*) is a side view of the female thread jig 300. As shown in FIGS. 4 (*a*) and 4 (*b*), the female thread jig 300 includes a main body portion 310 having a through hole 320 and flanges 330*a*, 330*b*. The flanges 330*a* and 330*b* radially outwardly bulge out from the main body portion 310 at both ends where the through hole 320 opens. A groove 350 is formed on the flange 330*a*. The groove 350 is used as a reference representing the optimal igniting position of the ground electrode 30 in the state that the metallic shell 50 is engaged with the female thread jig 300. The flange 330*a* has a face 332 generally perpendicular to the axis direction OD. Further, the flange 330*a* and the flange 330*b* have side faces 360 and 370, respectively, which are generally perpendicular to the face 332. The side face 360 is generally perpendicular to the side face 370. However, the side faces 360 and 370 are not necessarily positioned orthogonally to each other. The side faces 360 and 370 are used for a positioning which will be mentioned later. A standard female thread 331 for spark plugs specified by Japanese Industrial Standard B8031-1995 is formed in an inner face of the through hole 320. That is, the metallic shell 50 engaged with the female thread jig 300 is in the same state as being engaged with an internal combustion engine. Therefore, without actually mounting the spark plug 100 on an internal combustion engine, it is possible to check a state where the spark plug 100 with the metallic shell 50 is mounted on an internal combustion engine.

Figure 5:
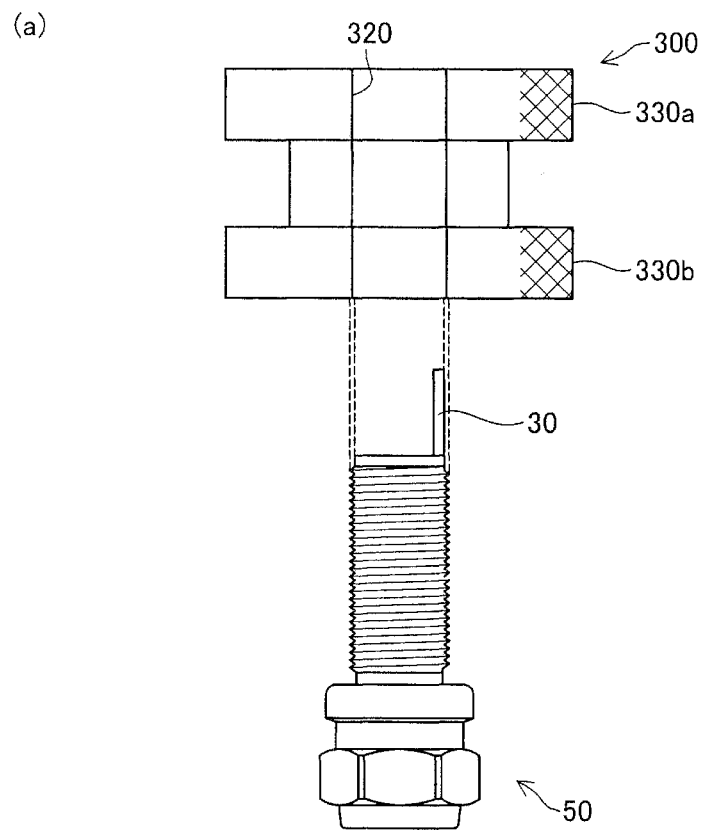
FIGS. 5a and 5b are explanatory views showing an engagement state of a metallic shell 50 and the female thread jig 300 according to the first embodiment.
Figure 5:
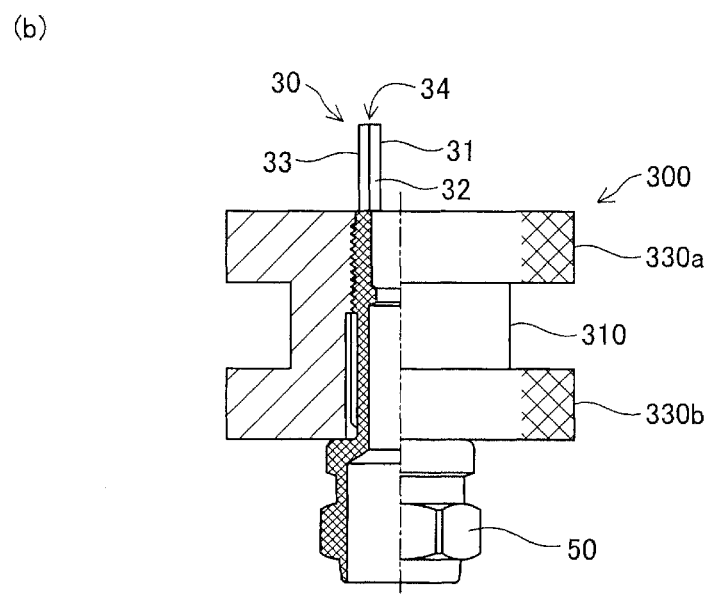

FIG. 5 is an explanatory view showing an engagement state of the metallic shell 50 and the female thread jig 300 according to the first embodiment. FIG. 5 (*a*) shows the state before engaging the metallic shell 50 with the female thread jig 300, and FIG. 5 (*b*) shows the state after engaging to the metallic shell 50 with the female thread jig 300. As shown in FIG. 5 (*a*), the metallic shell 50 is screwed into the through hole 320 from the flange 330*b* towards the flange 330*a* to thereby engage with the female thread jig 300. As a result, as shown in FIG. 5 (*b*), the ground electrode 30 projects from the flange 330*a*. The deviation of the ground electrode 30 is measured on a plane perpendicular to the axis direction OD (the axis O mentioned later) of the metallic shell 50, i.e., a plane parallel to the face 332. In order to improve the measurement accuracy, a position of measuring the deviation of the ground electrode 30 is not on a surface of the female thread jig, but is preferably a location near the joint portion of the ground electrode 30 and the metallic shell 50 with a height above a welding droop formed between the ground electrode 30 and the metallic shell 50. Thus, in the first embodiment, an imaginary plane perpendicular to the axis direction OD of the metallic shell 50 (the plane parallel to the face 332) and located near the joint portion of the ground electrode 30 and the metallic shell 50 is referred to as a measurement face 334. As explained above, the metallic shell 50 is engaged with the female thread jig 300.

Figure 6:
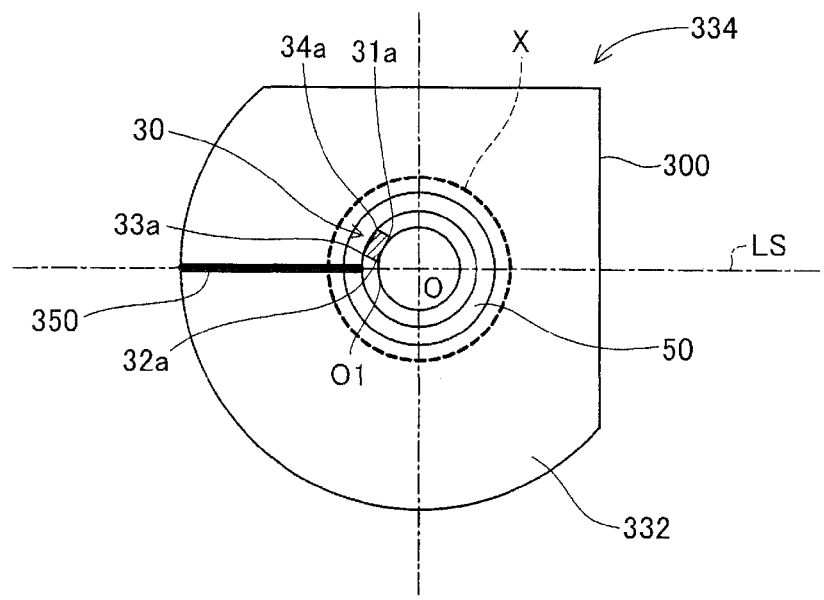
FIG. 6 is a top view of a measurement face 334 while the metallic shell 50 according to the first embodiment is engaged with the female thread jig 300.
Figure 7:
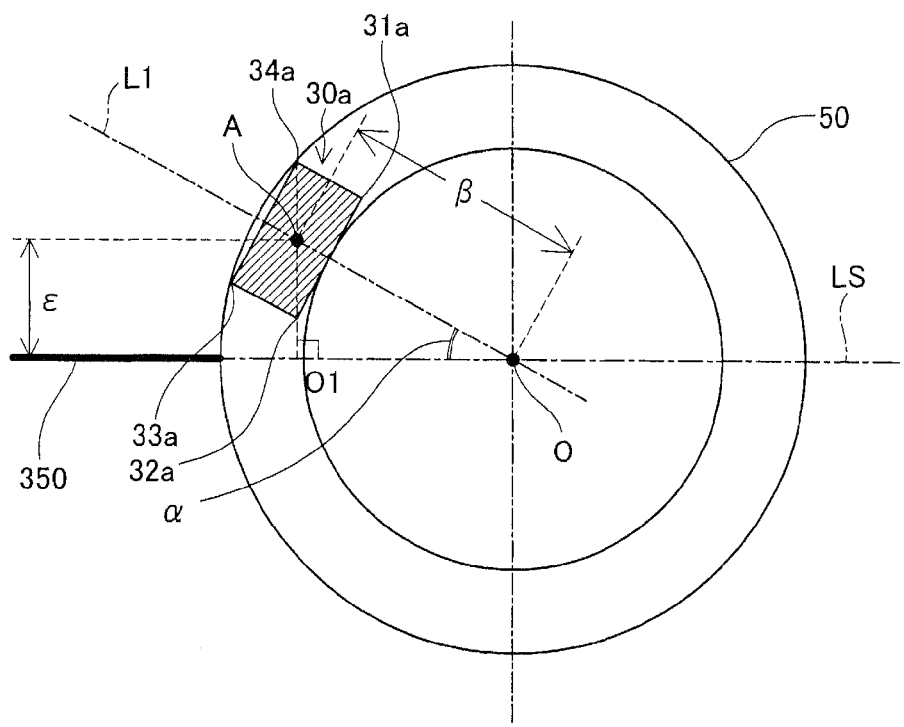
FIG. 7 is an explanatory view showing the deviation of the ground electrode 30 from the optimal igniting position (reference point in a circumferential direction) according to the first embodiment.

FIG. 6 is a top view of the measurement face 334 in the state where metallic shell 50 in the first embodiment was screwed in the female thread jig 300. A face 30*a* in FIG. 7 shows a cross section of the ground electrode 30. However, in FIG. 7, the face 30*a* of the ground electrode 30 in the measurement face 334 is not a physically sectioned face but a virtual cross section sectioned on the measurement face 334. In this embodiment, the face 30*a* is referred to as a virtual cross section 30*a*. As shown in FIG. 5, the ground electrode 30 assumes a quadratic prism having four sides 31, 32, 33 and 34. Each vertex 31*a*, 32*a*, 33*a*, and 34*a* of the virtual cross section 30*a* are the points of each side. The groove 350 is formed on the face 332 of the flange 330*a* of the female thread jig 300 so as to align with a straight line which passes through the axis O of the metallic shell 50. Therefore, the optimal igniting position of the ground electrode 30 is a location where the straight line passing through the groove 350 is aligned with the center C of the virtual cross section 30*a* of the ground electrode 30. In FIG. 6 and FIG. 7, a reference straight line "LS" serves as a straight line which passes the groove 350 and the axis O. Further, a reference point O1 in the circumferential direction corresponds to an intersection at the groove 350 side which is one of intersections of the reference straight line "LS" and a ridge formed by the front end face and the inner circumferential face of the metallic shell 50. Furthermore, the reference point O1 in the circumferential direction serves as an original point in the circumferential direction which centers around the axis O. In the first embodiment, the reference point O1 is the optimal igniting position. Henceforth, the reference point O1 is also referred to as the optimal igniting position O1 in this specification. In FIG. 7, an axis A of the ground electrode 30 is shifted from the optimal igniting position in the circumferential direction. That is, the ground electrode 30 is joined in a shifted manner from the optimal igniting position O1. The axis A corresponds to the axis of the ground electrode 30.

Returning to FIG. 3, the deviation of the ground electrode 30 from the optimal igniting position (reference point O1 in the circumferential direction) in the state where the metallic shell 50 is engaged with the female thread jig 300 will be measured (Step S22).

FIG. 7 is an explanatory view showing the deviation of the ground electrode 30 from the optimal igniting position (the reference point O1 in the circumferential direction) according to the first embodiment. FIG. 7 is an expanded view of an X portion in FIG. 6. In the first embodiment, an angle "α" between the reference straight line LS and a first straight line L1 which passes through the axis O of the metallic shell 50 and the axis A of the ground electrode 30 is calculated as a deviation of the ground electrode 30 from the optimal igniting position O1. The angle "α" is a circumferential angle centering on the axis O. Thus, the angle "α" is hereafter referred to as a circumferential angle "α". More particularly, the circumferential angle "α" between the first straight line L1 and the reference straight line LS is calculated using the following Equation 1, where "ε" is a distance (shortest distance) between the axis A of the ground electrode 30 and reference straight line LS (Step S30), and where "β" is a distance between the axis A of the ground electrode 30 and the axis O of the metallic shell 50 (Step S32).

$$\alpha = \sin^{-1}(\epsilon/\beta) \qquad \text{(Equation 1)}$$

The distance ε is a length of vertical line from the axis A to the reference straight line LS. The measuring method of the distance ε will be mentioned later. Moreover, the distance "β" is a length from the axis O of the metallic shell 50 to the axis A of the ground electrode 30. The distance "β" does not change even if the location of the ground electrode 30 shifts from the optimal igniting position. In addition, the distance "ε" is preferably measured near the joint portion of the ground electrode 30 and the metallic shell 50. More particularly, it is preferable that the distance "ε" be measured on the measurement face 334 at a height 5 mm above the welding droop that is formed between the metallic shell 50 and the ground electrode 30.

Figure 8:
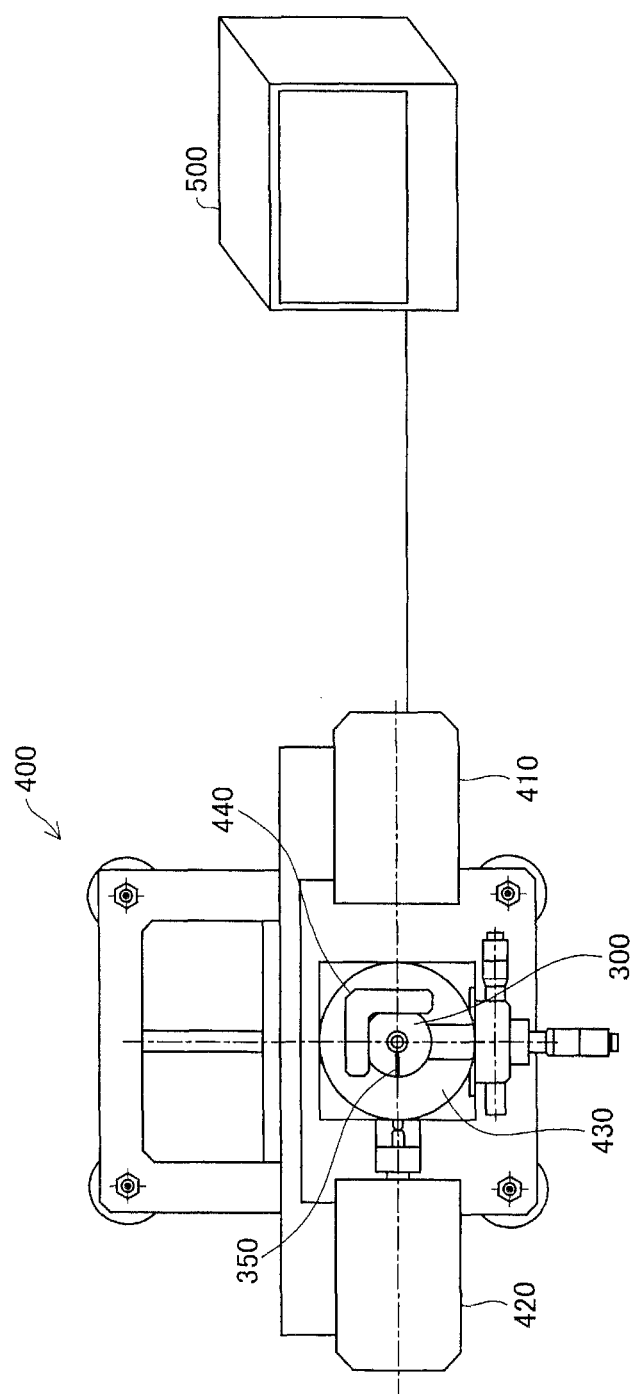
FIG. 8 is a diagram illustrating a translucent displacement sensor 400 in the first embodiment.
Figure 9:
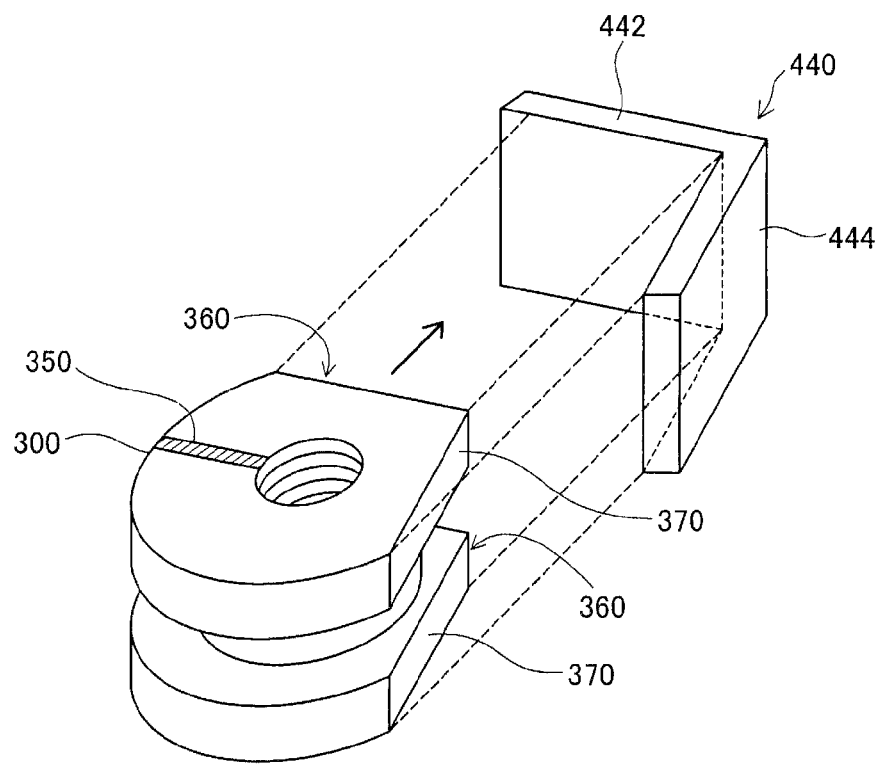
FIG. 9 is a diagram showing a positioning of the female thread jig 300 in the first embodiment.

Below, the measuring method of the distance "ε" will be described in detail. This step corresponds to Step S30 in FIG. 3. In the first embodiment, the distance "ε" is measured using a translucent displacement sensor 400. First, the translucent displacement sensor 400 will be described with reference to FIGS. 8 to 10. FIG. 8 is a diagram illustrating the translucent displacement sensor 400 in the first embodiment. FIG. 9 is a diagram describing a positioning of the female thread jig 300 in the first embodiment. FIG. 8 shows an upper surface of the translucent displacement sensor 400. As shown in FIG. 8, the translucent displacement sensor 400 includes a floodlight portion 410, a light sensing portion 420, a base 430 and a positioning portion 440. The floodlight portion 410 has a luminous source of LED (Light Emitting Diode) or the like. Further, the light sensing portion 420 has an image sensor, such as CCD (Charge Coupled Device Image Sensor). The positioning portion 440 is provided on the base 430. Furthermore, an operational unit 500 that calculates the circumferential angle "α" using the distance "ε" and the distance "β" both of which are measured by the translucent displacement sensor 400 is connected to the translucent displacement sensor 400. The operational unit 500 may be formed integrally with the translucent displacement sensor 400.

As shown in FIG. 9, the positioning portion 440 is a screen-like member constituted by boards 442 and 444. The positioning portion 440 is formed so that the female thread jig 300 may be easily positioned in a predetermined position of the base 430. More particularly, as show in FIG. 9, the boards 442 and 444 are brought into contact with the side faces 360 and 370 of the female thread jig 300, respectively, so that the axis of the female thread jig 300 (the axis O of metallic shell 50) is positioned in the predetermined position.

Figure 10:
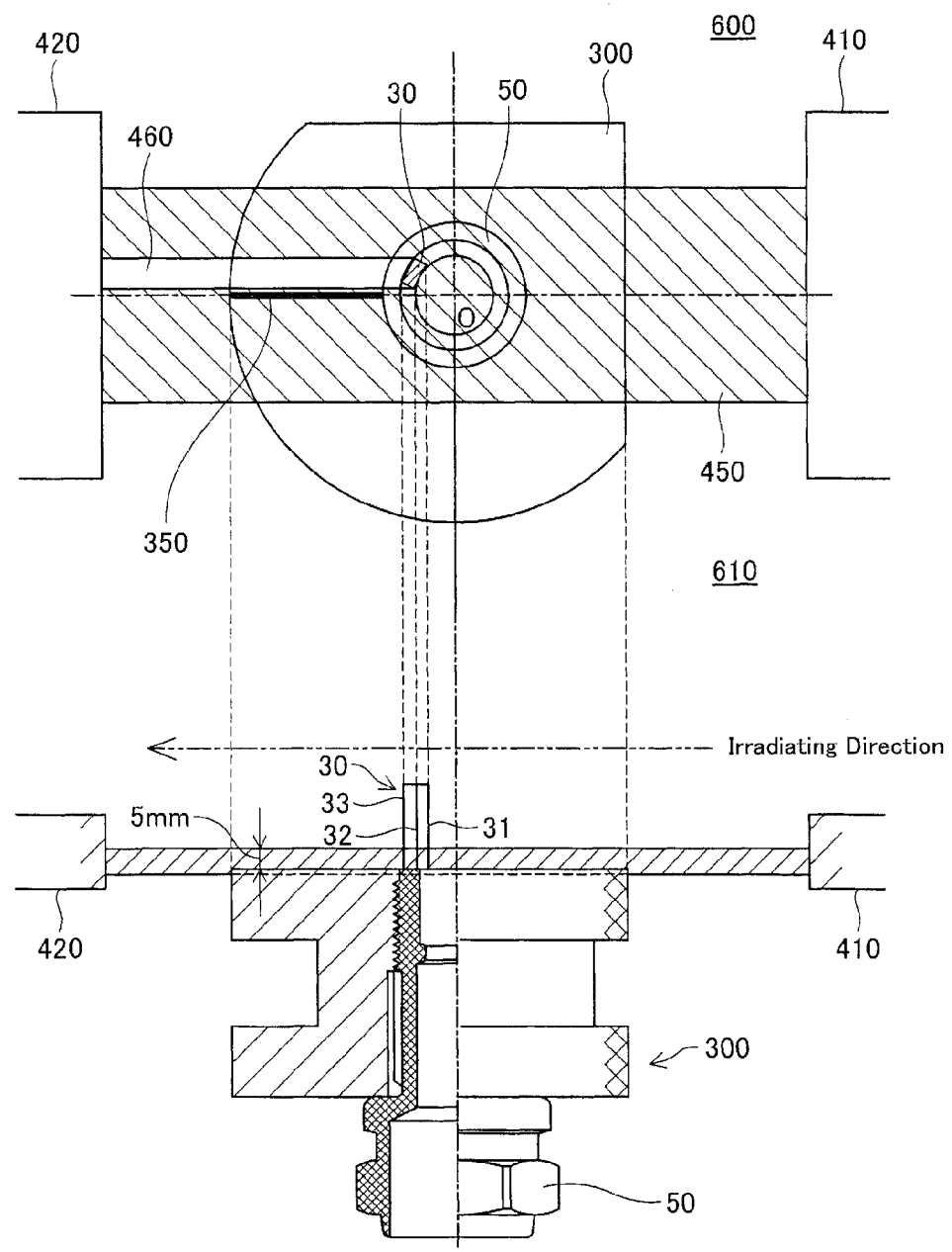
FIG. 10 is an explanatory view showing a measurement state of the translucent displacement sensor 400 in the first embodiment.

FIG. 10 is an explanatory view showing a measurement state of the translucent displacement sensor 400 in the first embodiment. FIG. 10 shows a top view 600 and a side view 610 which correspond to each other. FIG. 10 also shows a state that a light 450 is irradiated from the floodlight portion 410 to the light sensing portion 420 so as to light up the female thread jig 300 engaged with the metallic shell 50. Here, the female thread jig 300 is positioned by the positioning portion 440 on the base 430 so that the reference straight line LS may be aligned with the irradiating direction of the light 450 from the floodlight portion 410 to the light sensing portion 420. As shown in FIG. 10, the light irradiating from the luminous source of the floodlight portion 410 passes through the telecentric optical system constituted by an optical element, such as a collimating lens, and becomes a generally uniform parallel light. Such parallel light is irradiated to a measuring object (the metallic shell 50). At this time, a shadow 460 formed by the ground electrode 30 is formed into an image on an image sensor of the light sensing portion 420. Thereafter, the translucent displacement sensor 400 generates an image data representing the thus-formed image.

Figure 11:
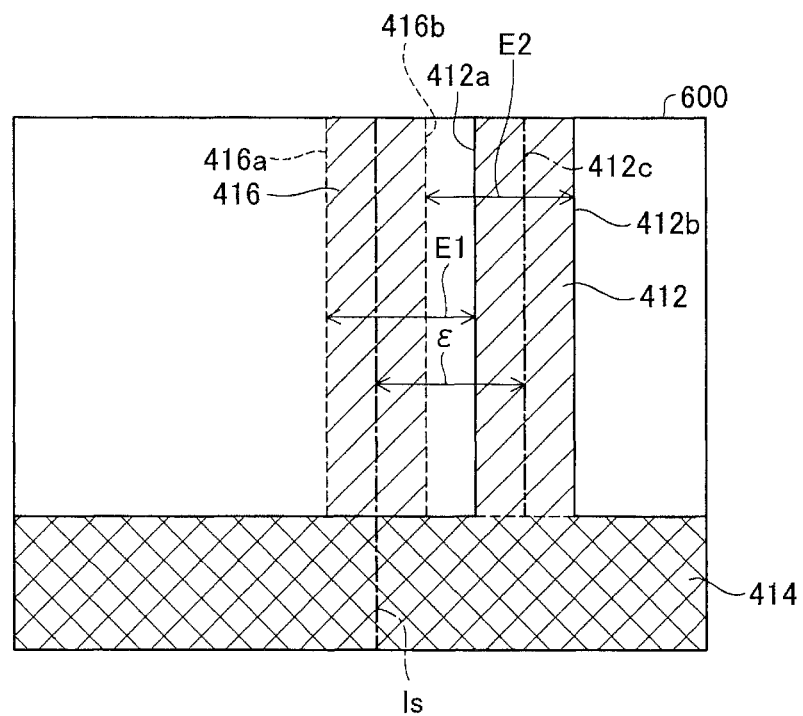
FIG. 11 is an explanatory view showing an image data 600 formed on an image sensor of a light sensing portion 420 in the first embodiment.

FIG. 11 is an explanatory view showing the image data 600 formed on the image sensor of the light sensing portion 420 in the first embodiment. In FIG. 11, a chain line "ls" shows the axis (the axis O of the metallic shell 50) of the female thread jig 300. As shown in FIGS. 8 and 9, since the female thread jig 300 is positioned in the predetermined position, the position of the chain line "ls" is predetermined according to the position of the axis of the female thread jig 300. An ignition optimal image 416 shows a shadow image of the ground electrode 30 when the ground electrode 30 is joined at the optimal igniting position O1. As shown in FIG. 11, when the ground electrode 30 is joined at the optimal igniting position O1, the axis A of the ground electrode 30 and the axis of the female thread jig 300 are mostly aligned. In the first embodiment, the translucent displacement sensor 400 uses edges 416a and 416b of the ignition optimal image 416 as a reference position. Henceforth, the edges 416a and 416b are referred to as reference positions 416a and 416b.

An image 412 shows a shadow image of the ground electrode 30, and an image 414 shows a shadow image of the female thread jig 300. In FIG. 11, the image 412 showing the ground electrode 30 has edges 412a and 412b which corresponds to the sides 32 and 34 (FIG. 5) of the ground electrode 30, respectively. Moreover, an axis 412c corresponds to the axis A of the ground electrode 30. The axis 412c is indicated only for the explanatory purpose and does not appear in the image data 600. The translucent displacement sensor 400 detects the edge 412a and judges that the edge 412a is displaced from the reference position 416a to thereby measure a deviation E1 between the reference position 416a and the edge 412a. Similarly, the translucent displacement sensor 400 detects the edge 412b and judges that the edge 412b is displaced from the reference position 416b to thereby measure a deviation E2 between the reference position 416b and the edge 412b. The thus-measured deviations E1 and E2 are applied to Equation 2 to find out the distance "ε".

$$\epsilon = (E1+E2)/2 \tag{Equation 2}$$

According to the measuring method of the first embodiment, the deviation of the ground electrode 30 from the optimal igniting position is measured based on the distance "ε" between the axis A of the ground electrode 30 and the reference straight line LS that passes through the axis O of metallic shell 50 and the groove 350 serving as a reference portion, while the metallic shell 50 serving as a measuring object is engaged with the female thread jig 300. Therefore, the deviation of the ground electrode 30 from the optimal igniting position can be confirmed in numerical terms. Thus, an accurate evaluation of the deviation of the joint position of the ground electrode 30 can be improved, and variations in the quality of the metallic shell 50 can be prevented.

Moreover, according to the measuring method of the first embodiment, the circumferential angle "α" formed between the reference straight line LS and the first straight line L1 which passes through the axis O of the metallic shell 50 and the axis A of the ground electrode 30 is calculated as a deviation. Therefore, the further accurate evaluation of the deviation of the ground electrode 30 from the optimal igniting position is achievable.

When the ground electrode 30 is joined in an inclining manner, variation in distance "ε" becomes large according to the measuring position of the distance "ε". As being away from the joint position of the metallic shell 50 and the ground electrode 30, incorrect measurement of the distance "ε" increases. Thus, since the distance "ε" is measured near the joint position (5 mm or less from the welding droop) of the ground electrode 30 and the metallic shell 50 according to the measuring method of the first embodiment, it is possible to prevent an incorrect measurement of the distance "ε" caused by the inclined ground electrode 30. As a result, the measurement accuracy of the distance "ε" can be improved.

Further, according to the measuring method of the first embodiment, the distance "ε" is measured based on each deviation E1 and E2 which are detected by the non-contact-type translucent displacement sensor 400. Thus, the distance "ε" between the axis A of the ground electrode 30 and the reference straight line LS can be measured with a simple configuration. Moreover, generally, since the measurement by a sensor requires only a short period of time, it is possible to reduce the measurement time of the deviation. Furthermore, by using the non-contact-type translucent displacement sensor 400, it is advantageous for avoiding any damage to the ground electrode 30 at the time of the measurement.

Further, according to the method for manufacturing the spark plug 100 of the first embodiment, the spark plug 100 is manufactured such that the ceramic insulator 10 is fitted to the metallic shell 50 in which the deviation of the joint position of the ground electrode 30 from the optimal igniting position is judged to be within an allowable range. Therefore, the spark plug 100 can be manufactured with few variations in the quality.

B. Second Embodiment

In a second embodiment, the distance "$\epsilon$" is measured using a contact-type displacement sensor. In the second embodiment, the method for manufacturing the spark plug 100 and the method for calculating the circumferential angle "$\alpha$" that corresponds to the deviation of the ground electrode 30 from the optimal igniting position are the same as those in the first embodiment, and only the measuring method of the distance "$\epsilon$" is different.

B1. Measuring Method of Distance "$\epsilon$"

Figure 12:
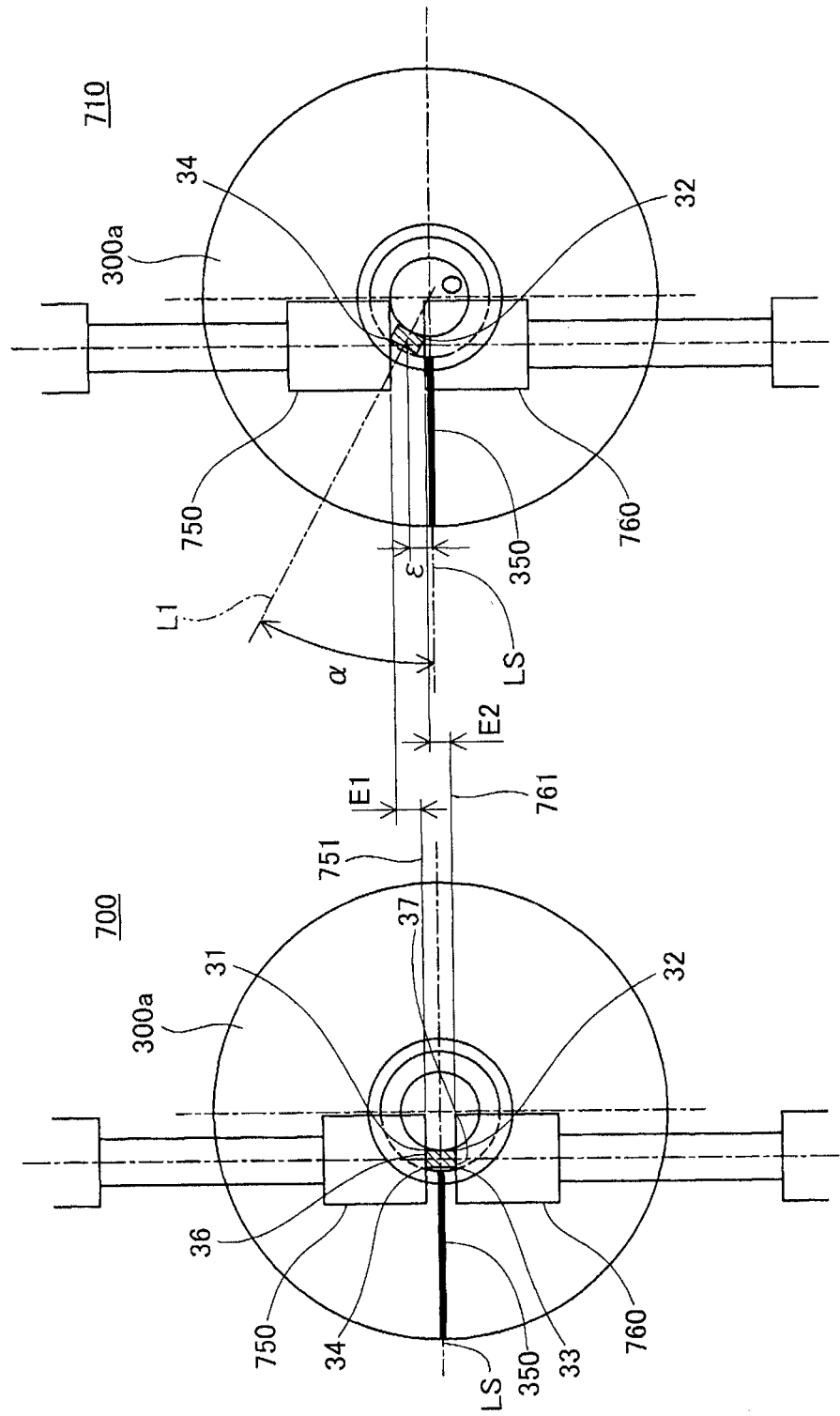
FIG. 12 is a diagram showing a measuring method of a distance ε using a contact-type displacement sensor in the second embodiment.

FIG. 12 is a diagram showing a measuring method of the distance "$\epsilon$" using the contact-type displacement sensor in the second embodiment. A top view 700 on the left-hand side of FIG. 12 shows a position of a displacement sensor when the ground electrode 30 is joined at the optimal igniting position while the metallic shell 50 is engaged with the female thread jig 300a. A top view 710 on the right-hand side of FIG. 12 shows a position of a displacement sensor when the ground electrode 30 is shifted from the optimal igniting position while the metallic shell 50 is engaged with the female thread jig 300a. As shown in FIG. 12, in the second embodiment, two sets of contact-type displacement sensors (a first contact-type displacement sensor 750 and a second contact-type displacement sensor 760) are used to measure the distance "$\epsilon$". The first and second contact-type displacement sensors 750 and 760 are arranged in the direction perpendicularly to the reference straight line LS. In the female thread jig 300a of the second embodiment, the groove 350 is used as a reference for positioning the contact-type displacement sensor.

More particularly, as shown in the top view 700, when the ground electrode 30 is joined at the optimal igniting position, the first contact-type displacement sensor 750 comes in contact with the side 36 that has the side 31 and the side 34 of the ground electrode 30, and the second contact-type displacement sensor 760 comes in contact with the side 37 having the side 32 and the side 33 of the ground electrode 30. The positions of the first contact-type displacement sensor 750 and the second contact-type displacement 760 in the top view 700 serve as reference positions 751 and 761, respectively.

As shown in the top view 710, when the ground electrode 30 is joined in a shifted manner in the circumference direction centering on the axis O of the metallic shell 50, the first contact-type displacement sensor 750 comes in contact with the side 34, and the second contact-type displacement 760 comes in contact with the side 32. The first contact-type displacement sensor 750 measures the deviation E1 from the reference position 751, and the second contact-type displacement 760 measures the deviation E2 from the reference position 761. The thus-measured deviations E1, E2 are applied to Equation 2 to thereby calculate the distance "$\epsilon$".

Similar to the first embodiment, the circumferential angle "$\alpha$" is calculated by applying the distance "$\epsilon$" obtained by Equation 2 and the invariable distance "$\beta$" to Equation 1.

According to the measuring method of the second embodiment, the distance "$\epsilon$" between the axis A of the ground electrode 30 and the reference straight line LS is measured using the first contact-type displacement sensor 750 and the second contact-type displacement sensor 760. Therefore, the distance "$\epsilon$" can be accurately measured.

C. Third Embodiment

In the third embodiment, an inspector visually observes and judges whether or not the deviation of the ground electrode 30 is within a predetermined allowable angle range, and only the metallic shells 50 within the allowable angle range are subject to the measurement of the deviation. In the third embodiment, the deviation of the ground electrode 30 is measured based on the allowable angle range indicated on a face 332b of a female thread jig 300b.

Figure 13:
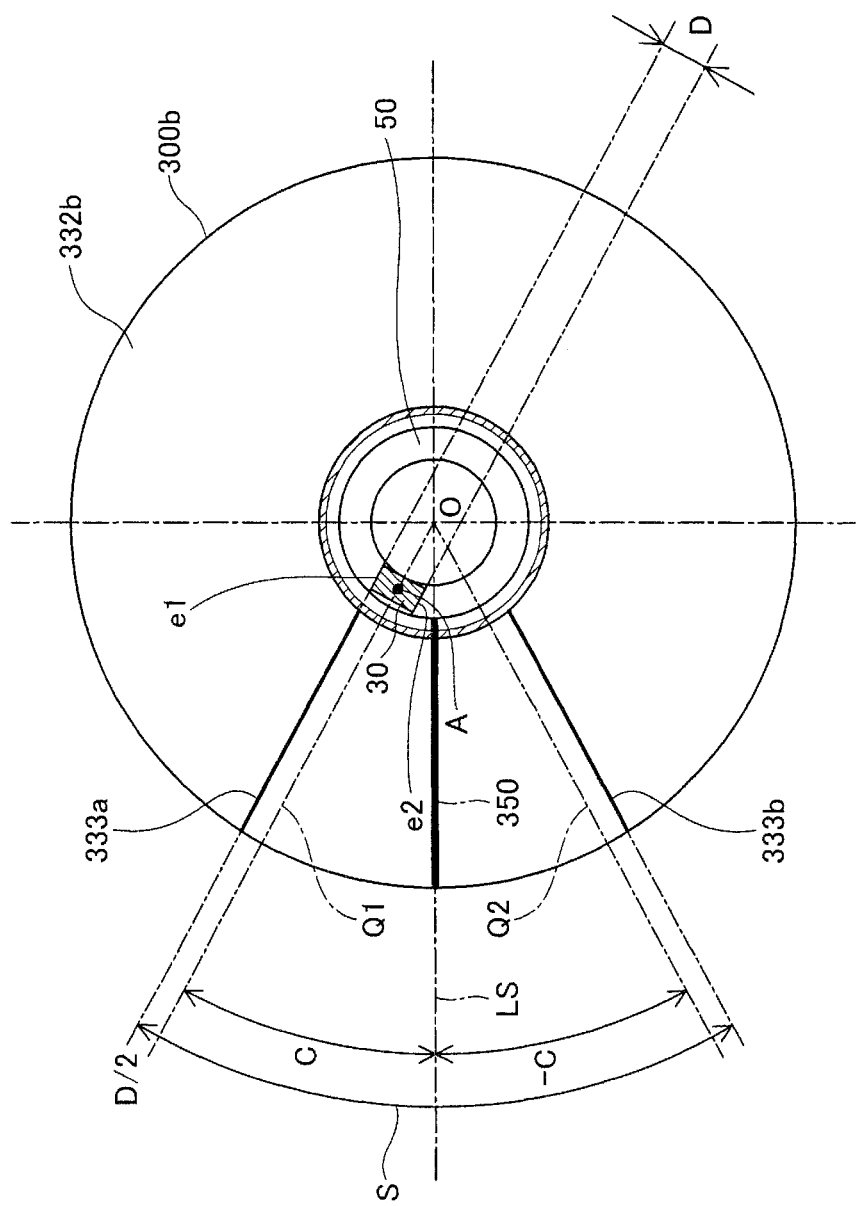
FIG. 13 is a top view showing an allowable angle range "S" formed on a face 332b of a female thread jig 300b in the third embodiment.

FIG. 13 is a top view showing an allowable angle range "S" formed on the face 332b of the female thread jig 300b in the third embodiment. FIG. 13 shows a state where the metallic shell 50 is engaged with the female thread jig 300b. The allowable angle range "S" is a predetermined angle defined by a groove 333a and a groove 333b in the circumferential direction. In FIG. 13, allowable angles "C" and "–C" serve as a limit angle of the center A of the ground electrode 30 in the circumferential direction. That is, the allowable angles "C", "–C" are the circumferential angles of the center A when the ground electrode 30 is joined in an allowable limited area that contributes to the high-quality metallic shell 50. In the female thread jig 300b of the third embodiment, the groove 350 is used as a reference for positioning the contact-type displacement sensor.

In the third embodiment, the groove 333a and the groove 333b showing the allowable angle range "S" are formed in a position including a width of the ground electrode 30. More particularly, the groove 333a is formed along an extensive line of an edge "e1" of a cross-sectioned face of the ground electrode 30 in the circumferential direction at a positive side when the center A of the ground electrode 30 is located within the allowable angle "C". Similarly, the groove 333b is formed along an extensive line of an edge "e2" of a cross-section face of the ground electrode 30 in the circumferential direction at a negative side when the center A of the ground electrode 30 is located within the allowable angle "–C". In other words, the groove 333a is formed at the positive side in the circumferential direction by D/2 (D: a circumferential width of the cross-sectioned face of the ground electrode 30) from a straight line Q1 that expresses the allowable angle C. The groove 333b is formed at the negative side in the circumferential direction by D/2 from a straight line Q2 that expresses the allowable angle –C. As a result, the allowable angle range "S" is defined as a range where the width "D" of the cross-sectioned face of the ground electrode 30 in the circumferential direction is added to the range from the allowable angle "C" to the allowable angle "–C".

In the third embodiment, similar to the first embodiment, in the state where the metallic shell 50 are engaged with the female thread jig 300, an inspector visually inspects the deviation of the ground electrode 30 to confirm whether or not the edge "e1" of the cross-sectioned face of the ground electrode 30 is located in the negative circumferential direction with respect to the groove 333a, and whether the edge "e2" of the cross-sectioned face of the ground electrode 30 is located in the positive circumferential direction with respect to the groove 333b. In this confirmation, the inspector may conduct direct visual observation of the face 332b or may use a projector to visually observe a projected image of the face 332b. When the edge "e1" is located in the negative circumferential direction with respect to the groove 333a and when the edge "e2" is located in the positive circumferential direction with respect to the groove 333b, the deviation of the ground electrode 30 is in the allowable angle range "S", and the quality of the metallic shell 50 is judged to be acceptable. When the edge "e1" is located in the positive circumferential direction with respect to the groove 333a or when the edge "e2" is located in the negative circumferential direction with respect to the groove 333b, the deviation of the ground electrode 30 is beyond the allowable angle range "S", and the quality of the metallic shell 50 is judged to be a defect. Only the metallic shells 50 having the accepted deviation of the ground electrode 30 are subject to a measurement of the distance "ϵ" by the translucent displacement sensor 400 and a measurement of the circumferential angle "α" (the deviation) using the operational unit 500.

According to the measuring method of the third embodiment, before the measurement of the deviation by the operational unit 500, the inspector judges whether or not the joint position of the ground electrode 30 is within the allowable angle range "S", and only the accepted metallic shells 50 are subject to the measurement of the distance "ϵ" and the calculation of the deviation using the operational unit 500. Therefore, the failed metallic shell 50 in the visual inspection is discarded before measuring the deviation. Thus, it is possible to improve a manufacturing speed of the metallic shell 50.

Figure 14:
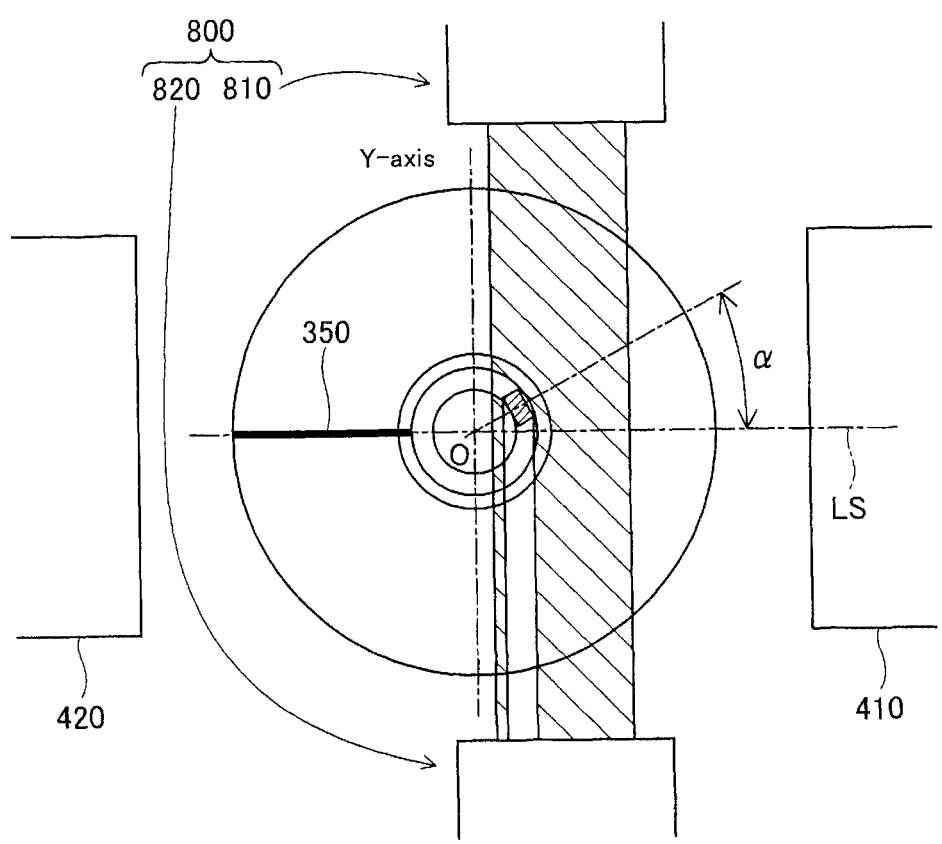
FIG. 14 is an explanatory view showing a state of measurement by a translucent displacement sensor in a modification.

D. Modification (1) In the first embodiment, the deviation (the circumferential angle "α") is measured by the translucent displacement sensor 400 provided with the pair of floodlight portions 410 and the light sensing portion 420. However, when the circumferential angle "α" (the deviation) is 90 degrees or more, the distance "ϵ" is the same value as that of the case where the circumferential angle "α" is less than 90 degrees. Therefore, in this modification, in order to more accurately calculate the deviation, a translucent displacement sensor 800 is employed (FIG. 14). The translucent displacement sensor 400 measures the distance "ϵ" in the similar manner to the first embodiment.

FIG. 14 is an explanatory view showing a state of measurement by the translucent displacement sensors 400 (410, 420) and 800 in the modification. The translucent displacement sensor 800 is provided with a pair of floodlight portions 810 and a light sensing portion 820, and used for detecting an object which exists between the floodlight portion 810 and the light sensing portion 820. That is, unlikely to the translucent displacement sensor 400, the translucent displacement sensor 800 is not used for detecting the deviation, but for detecting the existing object. The floodlight portion 810 and the light sensing portion 820 are positioned so that the light may be irradiated in the direction (Y-axis in FIG. 14) perpendicular to the reference straight line LS. Also, the floodlight portion 810 and the light sensing portion 820 are formed at the floodlight portion 410 side with respect to the Y-axis (a location where the ground electrode 30 can be detected when the ground electrode 30 is positioned in the range of circumferential angle α from 90 degrees to 270 degrees). In the female thread jig of the modification, the groove 350 is used as a reference for positioning the contact-type displacement sensor.

When the ground electrode 30 is detected by the translucent displacement sensor 800, it is found that the ground electrode 30 is located between the circumferential angle α=90 degrees and 270 degrees. Therefore, in this case, the following Equation 3 can be applied so as to accurately calculate a circumferential angle "α'". In addition, in Equation 3, an ABS (x) function is a function which calculates an absolute value of "x", and the circumferential angle α is a circumferential angle calculated with Equation 1.

$$\alpha'=(\alpha/ABS(\alpha))*180°-\alpha \qquad \text{(Equation 3)}$$

Further, according to the modification, the circumferential angle "α" can be accurately detected even though the circumferential angle "α", which serves as the deviation, is 90 degrees or more.

(2) In the first embodiment, the deviation E of the ground electrode 30 (the distance from the edge 416a serving as a reference position to the edge 412a) serves as the distance "ϵ". However, for example, in the image data 600, a location corresponding to the axis A of the ground electrode 30 may be defined to thereby calculate the distance between the chain line "ls" and the location corresponding to the axis A (i.e., the distance "ϵ"). For example, in FIG. 11, the image data 600 may be analyzed by a xy coordinate system in which a horizontal direction in the drawing serves as an x-axis and a vertical direction in the drawing serves as a y-axis. The distance "ϵ" may be calculated by difference in the x-coordinate of the location corresponding to the axis A of the ground electrode 30 and the x-coordinate of the chain line "ls". In order to determine the axis A, known various methods may be used instead of the above-mentioned coordinate system.

The present invention is not particularly limited to the embodiments described above but may be changed or modified in various ways within the scope of the invention.

DESCRIPTION OF REFERENCE NUMERALS

5: gasket
6: ring member
8: plate packing
9: talc
10: ceramic insulator
12: axial bore
13: leg portion
15: step portion
17: front trunk portion
18: rear trunk portion
19: flange
20: center electrode
30: ground electrode
30a: virtual cross-section
31, 32, 33, 34: side
36,37: side face
40: terminal fitting
50: metallic shell
51: tool engagement portion
52: mount screw portion
53: caulking portion
54: sealing portion
55: seating portion
56: step portion
58: buckle portion
59: screw neck
100: spark plug
200: engine head
201: thread mounting hole
205: opening perimeter edge
300, 300a, 300b: female thread jig
310: main body portion
320: through hole
330a: flange
330b: flange
334: measurement face
332b: face
333a, 333b, 350: groove
360: side face
400: translucent displacement sensor
410: floodlight portion 412: image
412a: edge
412c: axis line
414: image
416: ignition optimal image
416a: reference position
420: light sensing portion
430: base
440: positioning portion
442: board
450: light
460: shadow
500: operational unit
600: image data
750: first contact-type displacement sensor
751: reference position
760: second contact-type displacement
761: reference position
800: translucent displacement sensor
810: floodlight portion
820: light sensing portion

The invention claimed is:

1. A method for measuring a deviation of a member from a joint target position comprising the steps of:
   joining a member to a measuring object having an end face at a position other than an axis of the measuring object on the end face;
   engaging the measuring object with a female thread jig having a reference portion that serves as a reference for the joint target position of the member in the measuring object;
   measuring a shortest distance between an axis of the member and a reference straight line which connects the axis of the measuring object to the reference portion on a planar measuring face that is perpendicular to the axis of the measuring object, said measuring object being engaged with the female thread jig; and
   measuring a deviation of the member from the joint target position based on the thus-measured shortest distance.

2. The measuring method according to claim 1, wherein the measuring object is a metallic shell for spark plugs, and the member is a ground electrode joined to the metallic shell.

3. The measuring method according to claim 2, wherein the deviation is represented by an angle between the reference straight line and a first straight line that passes through the axis of the measuring object and the axis of the member, and
   wherein, in the measurement of the deviation, the angle is calculated based on the shortest distance and a length between the axis of the member and the axis of the measuring object.

4. The measuring method according to claim 2, wherein the measuring face is a face near a joint portion of the member and the measuring object.

5. The measuring method according to claim 2, wherein, in the measurement of the deviation, the shortest distance between the axis of the member and the reference straight line is measured by a non-contact-type translucent displacement sensor.

6. The measuring method according to claim 2, wherein, in the measurement of the deviation, the shortest distance between the axis of the member and the reference straight line is measured by a contact-type displacement sensor.

7. The measuring method according to claim 1, wherein the deviation is represented by an angle between the reference straight line and a first straight line that passes through the axis of the measuring object and the axis of the member, and
   wherein, in the measurement of the deviation, the angle is calculated based on the shortest distance and a length between the axis of the member and the axis of the measuring object.

8. The measuring method according to claim 7, wherein the measuring face is a face near a joint portion of the member and the measuring object.

9. The measuring method according to claim 7, wherein, in the measurement of the deviation, the shortest distance between the axis of the member and the reference straight line is measured by a non-contact-type translucent displacement sensor.

10. The measuring method according to claim 7, wherein, in the measurement of the deviation, the shortest distance between the axis of the member and the reference straight line is measured by a contact-type displacement sensor.

11. The measuring method according to claim 1, wherein the measuring face is a face near a joint portion of the member and the measuring object.

12. The measuring method according to claim 11, wherein, in the measurement of the deviation, the shortest distance between the axis of the member and the reference straight line is measured by a non-contact-type translucent displacement sensor.

13. The measuring method according to claim 11, wherein, in the measurement of the deviation, the shortest distance between the axis of the member and the reference straight line is measured by a contact-type displacement sensor.

14. The measuring method according to claim 1, wherein, in the measurement of the deviation, the shortest distance between the axis of the member and the reference straight line is measured by a non-contact-type translucent displacement sensor.

15. The measuring method according to claim 1, wherein, in the measurement of the deviation, the shortest distance between the axis of the member and the reference straight line is measured by a contact-type displacement sensor.

16. A method for manufacturing a spark plug comprising the steps of:
   joining a ground electrode to an end face of a cylindrical metallic shell;
   engaging the metallic shell joined to the ground electrode with a female thread jig having a reference portion that serves as a reference of a joint target position of the ground electrode in the metallic shell;
   measuring a shortest distance between an axis of the ground electrode that is joined to the metallic shell and a reference straight line which connects the axis of the metallic shell to the reference portion on a planar measuring face that is perpendicular to the axis of the metallic shell, said metallic shell being engaged with the female thread jig;
   measuring a deviation of the ground electrode from the joint target position based on the thus-measured shortest distance;
   judging whether or not the measured deviation is within a predetermined allowable range;

fitting an insulator to which a center electrode and a terminal fitting are assembled to the metallic shell in which the deviation is judged to be within the allowable range; and forming a front end of the ground electrode so as to face the center electrode.

* * * * *